Figure 2:
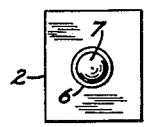

Sept. 30, 1952 T. NELSON 2,612,394
WELDING STUD
Filed Aug. 19, 1946

INVENTOR
TED NELSON
Charles S. Evans
his ATTORNEY

Patented Sept. 30, 1952

2,612,394

UNITED STATES PATENT OFFICE 2,612,394

WELDING STUD

Ted Nelson, San Leandro, Calif., assignor to Gregory Industries, Inc., a corporation of Michigan Application August 19, 1946, Serial No. 691,418

6 Claims. (Cl. 287—20.2)

My invention relates to studs designed to be arc-welded to another body; and one of the objects of the invention is the provision of such a stud in which the welding-end structure, including a flux, is capable of rapid production at low cost relative to comparable studs.

The invention possesses other objects, some of which with the foregoing will be set forth at length in the following description wherein are explained those forms of the invention which have been selected for illustration in the drawings accompanying and forming a part of this specification. In said drawings, illustrative forms of the invention are shown, but it is to be understood that it is not limited to those forms, since the invention as set forth in the claims may be embodied in a plurality of other forms.

Figure 4:
Figure 1:
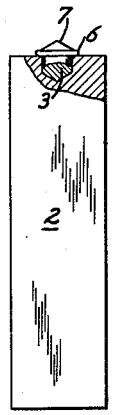
Figure 3:
Figure 5:
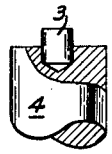

Referring to the drawings: Figures 1 and 2 are elevation and top views respectively, of one embodiment of my invention. Figures 3 and 4 are respectively similar views of another embodiment. Figure 5 is an elevation of the welding end of a cylindrical stud, partly in section, and showing the flux slug in place before being subjected to die pressure to form the slug into a centering point as illustrated in Figure 1. The figures are all drawn to an enlarged scale.

In recent years there has been a steadily increasing use of arc-welded studs in many different lines of manufacture. While it is possible to compound a stud steel which in the laboratory makes satisfactory welds without the use of a fluxing material, it has never been a practicable and commercial possibility to use such unfluxed studs. There has therefore come into being a need for a low-cost, easily made stud structure in which a small solid body or slug of a simple and cheap flux material is embodied in the welding end of a stud formed of ordinary soft steel.

Aluminum is a suitable flux in such a stud; and therefore in its broadest conception, my stud structure comprises the permanent fixing of a small slug of a welding flux material in the welding end of a stud. A more restricted phase of the conception, comprises the formation of the slug and its placement in the stud body, so that it facilitates the locating of the stud on the desired center.

The first studs were cylindrical in form, but the requirements of the many industries in which studs have now become important have developed studs of different cross section. Studs having a circular cross section are probably the commonest form, but square and other rectangular shapes are frequent, and studs of ellipsoidal or irregular section not uncommon. Irrespective of shape however the function of the flux is the same; and in the drawings, I am illustrating two shapes of studs, rectangular and circular in cross section; and two types of flux slug. One, in which only the function of fluxing the weld is performed; and the other, in which two functions are performed, centering the stud on the desired weld site and fluxing the weld.

With reference first to Figures 1 and 2, my device comprises a stud body 2 of elongated rectangular cross section, in the end of which a shallow recess or depression is formed by any suitable means such as a cutting tool or punch. The sides of the recess are parallel to the longitudinal axis of the stud, just as they would be left by a drill or punch, and are not undercut since that would involve added expense and time without compensation advantage.

Usually the recess is drilled; and for studs of about ⅜″ diameter, the depth of the recess above the taper is of the order of $\frac{1}{16}$″, and its diameter ⅛″.

After the recess has been formed, a short cylindrical slug 3 of aluminum is inserted in the recess as shown in connection with the stud 4 in Figure 5; and then pressure is applied against the end of the slug by a die having a conical recess therein complementary to the shape which is to be imparted to the end of the slug. Such pressure causes the metal of the slug to flow into the die recess and also into the stud recess, so that both are filled, the metal being jammed so tightly against the lateral sides of the stud recess in a direction at right angles to the direction of pressure that the slug is securely and permanently fixed in the stud.

The exposed end of the slug which is formed by the die comprises a thin flange 6 extruded between the die and stud, and overlying the central part of the stud. Formed in and by the die recess is a cone point 7, lying in the central longitudinal axis of the stud. The cone point greatly facilitates the placing of the stud on the punch mark which usually indicates the center of the weld.

When the stud which has just been described is welded to a plate or other base structure by the use of a welding gun such as shown in my co-pending application Serial No. 528,196, the cone point permits a quick and accurate placement of the stud on the marked location, and the body of the slug melts in the arc to form the desired flux for the molten metal of the stud and base.

In Figures 3 and 4, I have shown a still simpler form of my invention, applied to a cylindrical stud 8. Where studs are welded more or less automatically in welding machines, the studs are placed by operation of the mechanism and therefor no need exists for the cone center. For such studs, the slug of aluminum is only long enough to fill the recess in the stud, but usually a small amount is extruded on the end of the stud in a thin flange or pad 9.

In both of the studs shown, it is to be understood that the flange is formed rather as an incidental result of the axial pressure applied to the slug to deform it laterally against the recess sides, than as a primarily desired result in itself. The slug may be so proportioned and the die so shaped and applied, that substantially no flange is extruded between the stud and die. This works equally as well as with a flange, but since a small flange adds only slightly to the quantity of flux and since complete elimination of the flange adds expense which becomes material in large volume, machines and operations are planned for the most economical and rapid production; and in this, a small flange usually appears.

I claim:

1. A welding stud having an aperture in the welding end thereof, and a solid body of welding flux material filling the aperture and extending beyond the extreme end of the stud in a point by which the stud may be positioned for welding.

2. A welding stud having an aperture in the welding end thereof, and a slug of welding flux material expanded against the sides of the aperture to fix the slug therein.

3. A welding stud having an aperture in the welding end thereof, and a slug of welding flux material expanded against the sides of the aperture to fix the slug therein and extending beyond the extreme end of the stud in a point by which the stud may be positioned for welding.

4. A welding stud having an aperture in the welding end thereof and a metallic slug of welding flux material expanded against the sides of the aperture to fix the slug therein.

5. A welding stud having an aperture in the welding end thereof and a slug of welding flux material expanded against the sides of the aperture to fix the slug therein, said welding flux material comprising an aluminum composition.

6. A welding stud having an aperture in the welding end thereof and a slug of welding flux material fixed in the aperture, said slug of flux material being in compressed engagement with the sides of the aperture.

TED NELSON.

REFERENCES CITED

The following references are of record in the file of this patent:

UNITED STATES PATENTS

| Number | Name | Date |
|---|---|---|
| 995,685 | Knox | June 20, 1911 |
| 2,054,187 | Almdale | Sept. 15, 1936 |
| 2,095,885 | Moreira et al. | Oct. 12, 1937 |
| 2,263,166 | Darvie | Nov. 18, 1941 |
| 2,268,416 | Nelson | Dec. 30, 1941 |
| 2,275,438 | Hothersall | Mar. 10, 1942 |
| 2,355,099 | Nelson | Aug. 8, 1944 |
| 2,402,659 | Nelson | June 25, 1946 |
| 2,413,370 | Palmer | Dec. 31, 1946 |